(12) United States Patent
Matsubara

(10) Patent No.: US 12,134,294 B2
(45) Date of Patent: Nov. 5, 2024

(54) LOAD WEIGHT DERIVATION DEVICE, CONTROL DEVICE, SUSPENSION SYSTEM, SADDLE-RIDE-TYPE VEHICLE, VEHICLE HEIGHT ADJUSTMENT DEVICE

(71) Applicant: Hitachi Astemo, Ltd., Hitachinaka (JP)

(72) Inventor: Kentaro Matsubara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 305 days.

(21) Appl. No.: 17/695,469

(22) Filed: Mar. 15, 2022

(65) Prior Publication Data

US 2022/0203793 A1 Jun. 30, 2022

Related U.S. Application Data

(63) Continuation of application No. PCT/JP2020/024556, filed on Jun. 23, 2020.

(51) Int. Cl.
*B60G 17/016* (2006.01)
*B60G 17/027* (2006.01)

(52) U.S. Cl.
CPC ....... *B60G 17/016* (2013.01); *B60G 17/0272* (2013.01); *B60G 2300/12* (2013.01); *B60G 2500/30* (2013.01)

(58) Field of Classification Search
CPC .. B60G 17/016; B60G 17/0272; B60G 17/08; B60G 17/019; B60G 2500/10; B60G 2500/30; B60G 2300/12; B60G 2400/25; B60G 2400/60; G01G 19/12; B62K 25/04

USPC ......................................................... 701/37
See application file for complete search history.

(56) References Cited

U.S. PATENT DOCUMENTS 10,654,331 B2 * 5/2020 Murakami ............ B60W 40/13
2019/0001776 A1 1/2019 Murakami et al.
2020/0171909 A1 6/2020 Murakami

FOREIGN PATENT DOCUMENTS

| JP | 63063924 A | 3/1988 |
| JP | 2003232396 A | 8/2003 |
| JP | 2018144650 A | 9/2018 |
| JP | 2019077198 A | 5/2019 |

OTHER PUBLICATIONS

International Search Report mailed Sep. 1, 2020 for the corresponding International Patent Application No. PCT/JP2020/024556, 5 pages [English translation attached].
International Written Opinion mailed Sep. 1, 2020 for the corresponding International Patent Application No. PCT/JP2020/024556, 4 pages.

* cited by examiner

*Primary Examiner* — Hai H Huynh
(74) *Attorney, Agent, or Firm* — Leason Ellis LLP; Edward J. Ellis; Melvin C. Garner

(57) ABSTRACT

The load weight derivation device comprises a calculation unit that calculates a contraction amount of a spring in a suspension positioned between a vehicle body and a vehicle wheel, and a derivation unit that derives the weight loaded on the vehicle body using the contraction amount calculated by the calculation unit.

6 Claims, 12 Drawing Sheets

LOAD WEIGHT DERIVATION DEVICE, CONTROL DEVICE, SUSPENSION SYSTEM, SADDLE-RIDE-TYPE VEHICLE, VEHICLE HEIGHT ADJUSTMENT DEVICE

CROSS REFERENCE TO RELATED APPLICATIONS

This application is a Continuation of International Patent Application No. PCT/JP2020/024556 filed on Jun. 23, 2020, the content of which is incorporated herein by reference in its entirety.

FIELD OF THE INVENTION

The present invention relates to a load weight derivation device, a control device, a suspension system, saddle-type vehicle, and a vehicle height adjustment device.

BACKGROUND OF THE INVENTION

In recent years, suggested is a technology for controlling a damping force of a damping device according to a change in stroke amount.

For example, a device described in JP 2019-77198 A is configured as follows. That is, the device includes a suspension having a damping device configured to attenuate a force generated between a vehicle main body and a wheel, and a damping force control unit that, when acceleration of a change in stroke amount, which is a displacement amount from a reference position of the wheel with respect to the vehicle main body, in an extension direction of the suspension is equal to or greater than a predetermined value, makes a damping force of the damping device larger than when the acceleration is smaller than the predetermined value.

In addition, suggested is control of a damping force considering a load weight.

For example, a device described in JP 2003-232396 A is configured as follows. That is, a control valve configured to control flow of oil is provided to a part configured to communicate with a cylinder chamber, presence or absence of a passenger on a rear seat is sensed with a load weight sensor, and when there is a passenger, a valve closing signal is sent from an ECU to a drive motor to make the cushioning hard.

CITATION LIST

Patent Literature

PTL 1: JP 2019-77198 A
PTL 2: JP 2003-232396 A

When a difference between a load weight assumed in advance and an actual load weight is large, a variable amount of the damping force may be exceeded or insufficient. For this reason, when changing the damping force according to the load weight, it is important to specify the load weight with high accuracy.

An object of the present invention is to provide a load weight derivation device and the like capable of specifying a load weight with high accuracy.

SUMMARY OF THE INVENTION

In the below, the present disclosure is described.

One aspect of the present disclosure is a load weight derivation device including a calculation unit configured to calculate an amount of contraction of a spring of a suspension arranged between a vehicle main body and a wheel; and a derivation unit configured to derive a weight loaded on the vehicle main body by using the amount of contraction calculated by the calculation unit.

Here, the calculation unit may be configured to calculate the amount of contraction by using a stroke amount of the suspension during traveling of a vehicle, and an amount of movement of a support member in an adjustment unit configured to adjust a load of the spring by moving the support member configured to support the spring.

In addition, the calculation unit may be configured to set, as the amount of contraction, a value obtained by adding the amount of movement to a subtraction value obtained by subtracting the stroke amount from a predetermined reference value.

Alternatively, the calculation unit may be configured to calculate the amount of contraction by using a stroke amount of the suspension during traveling of a vehicle.

Further, the calculation unit may be configured to set, as the amount of contraction, a value obtained by subtracting the stroke amount from a predetermined reference value.

Another aspect of the present disclosure is a control device including a calculation unit configured to calculate an amount of contraction of a spring of a suspension arranged between a vehicle main body and a wheel; a derivation unit configured to derive a weight loaded on the vehicle main body by using the amount of contraction calculated by the calculation unit; and a control unit configured to control to change a damping force of the suspension, according to the weight derived by the derivation unit.

Another aspect of the present disclosure is a suspension system including the control device according to the above-described aspect; and a suspension whose damping force is controlled by the control device.

Another aspect of the present disclosure is a saddle-type vehicle including a vehicle main body, a wheel, and the suspension system according to the above-described aspect.

Another aspect of the present disclosure is a vehicle height adjustment device including a suspension having a spring arranged between a vehicle main body and a wheel; an adjustment unit configured to adjust a load of the spring by moving a support member supporting the spring; a calculation unit configured to calculate an amount of contraction of the spring; a derivation unit configured to derive a weight loaded on the vehicle main body by using the amount of contraction calculated by the calculation unit; and a control unit configured to control to change an amount of movement of the support member, according to the weight derived by the derivation unit.

According to the present invention, it is possible to provide the load weight derivation device and the like capable of specifying a load weight with high accuracy.

DETAILED DESCRIPTION OF THE INVENTION

Hereinafter, embodiments of the present invention will be described in detail with reference to the accompanying drawings. Note that, the embodiments described below are examples of the embodiment of the present invention, and the present invention is not limited to the embodiments described below.

First Embodiment

Figure 1:
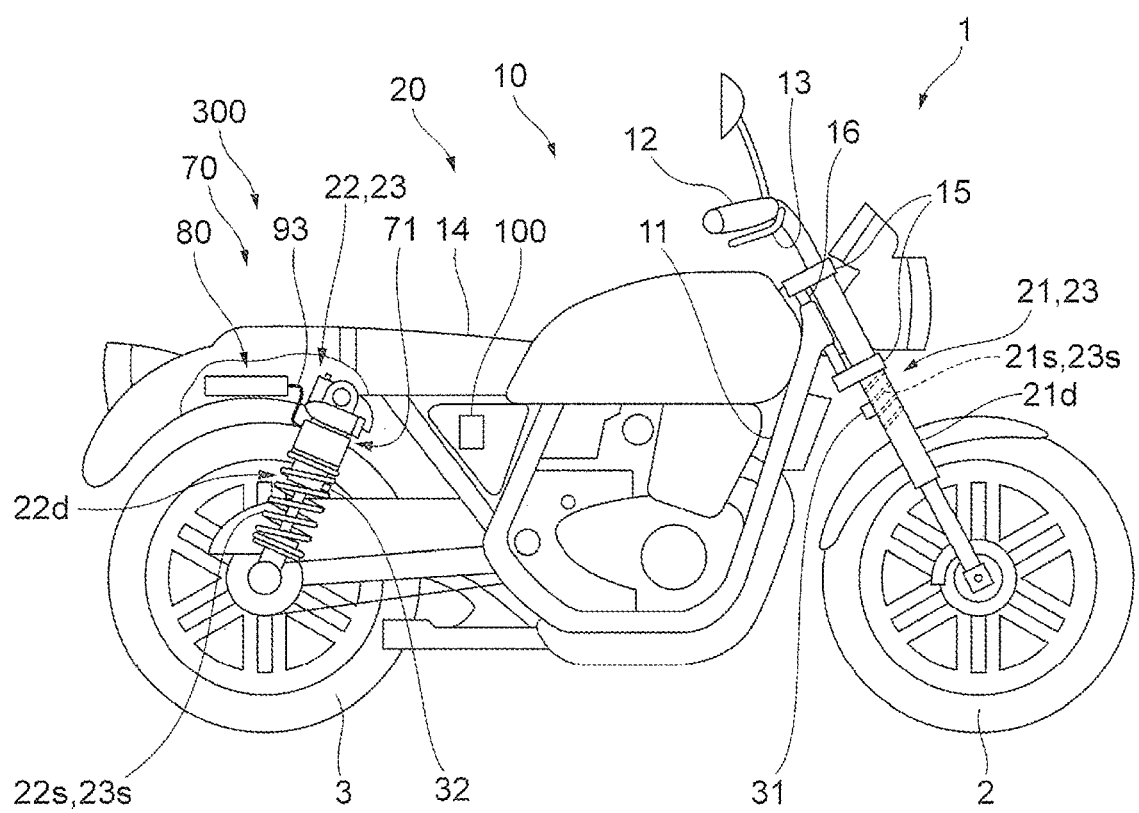
FIG. 1 shows an example of a schematic configuration of a two-wheeled motor vehicle 1 according to a first embodiment.

FIG. 1 shows an example of a schematic configuration of a two-wheeled motor vehicle 1 according to a first embodiment.

Figure 2:
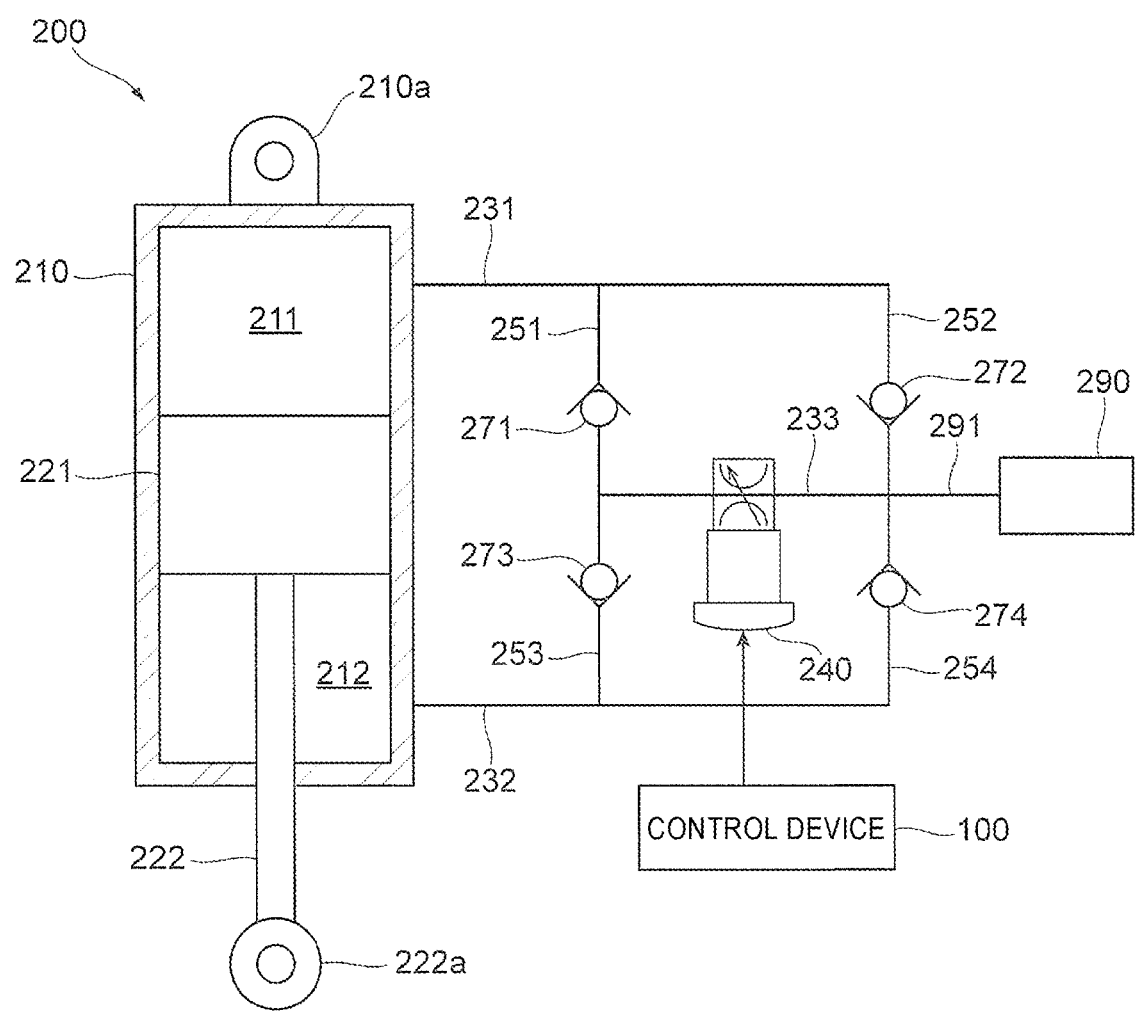
FIG. 2 shows an example of a schematic configuration of a damping device 200.

FIG. 2 shows an example of a schematic configuration of a damping device 200.

Figure 3:
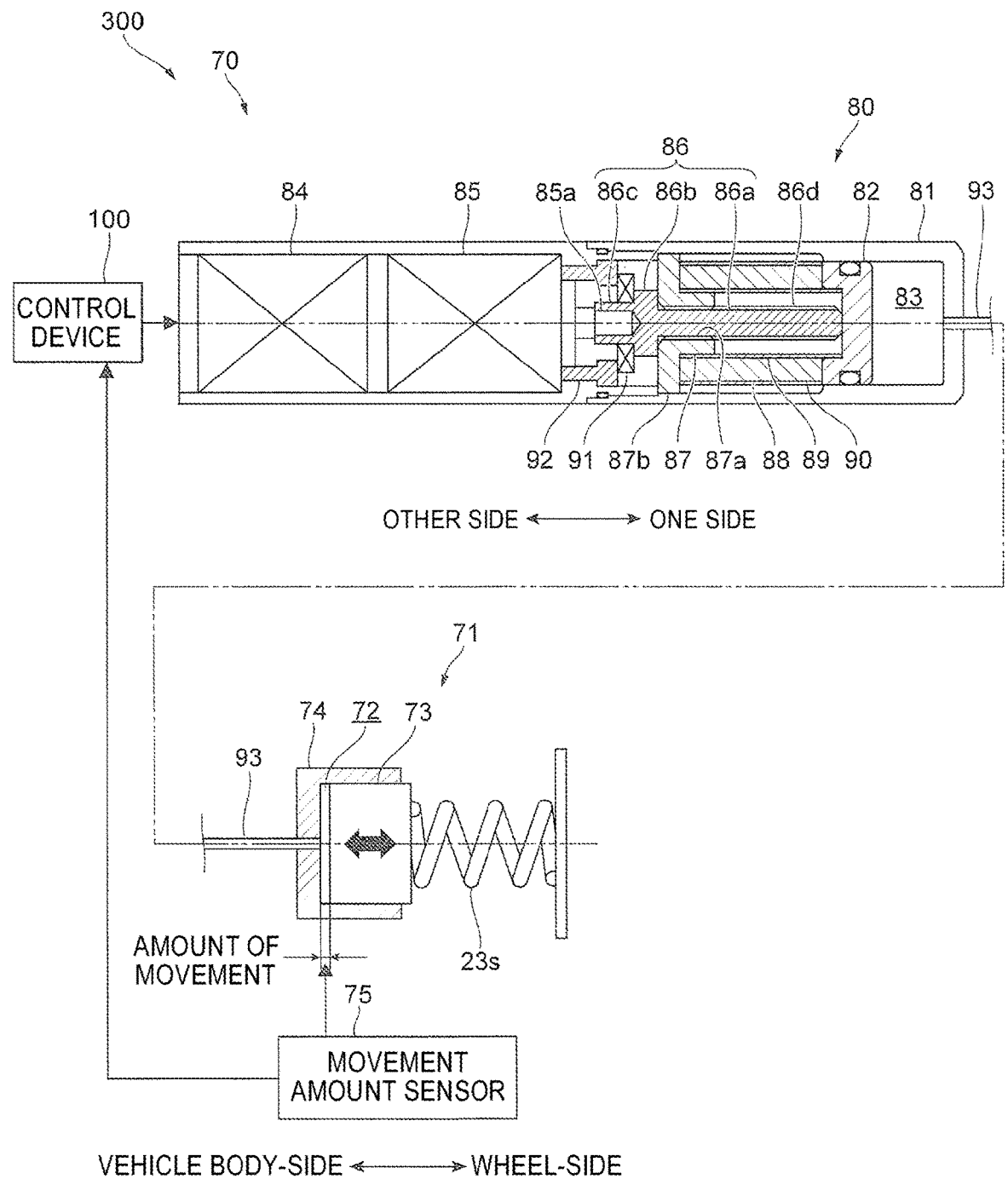
FIG. 3 shows an example of a schematic configuration of a vehicle height adjustment device 300.

FIG. 3 shows an example of a schematic configuration of a vehicle height adjustment device 300.

FIG. 1 is referred to. The two-wheeled motor vehicle 1 as an example of the straddle-type vehicle has a front wheel 2, which is a wheel on a front side, a rear wheel 3, which is a wheel on a rear side, and a vehicle main body 10. The vehicle main body 10 has a vehicle body frame 11, a handle 12, a brake lever 13 and a seat 14.

In addition, the two-wheeled motor vehicle 1 includes suspensions 21 on the front wheel 2-side, which are configured to connect the front wheel 2 and the vehicle main body 10 each other and provided on each of left and right sides of the front wheel 2. Further, the two-wheeled motor vehicle 1 includes two brackets 15 configured to hold the two suspensions 21, and a shaft 16 arranged between the two brackets 15. The suspension 21 has a spring 21s configured to absorb an impact applied to the front wheel 2 from a road surface or the like, and a damping device 21d configured to attenuate vibration of the spring 21s.

In addition, the two-wheeled motor vehicle 1 includes suspensions 22 on the rear wheel 3-side, which are configured to connect the rear wheel 3 and the vehicle main body 10 each other and provided on each of left and right sides of the rear wheel 3. The suspension 22 has a spring 22s configured to absorb an impact applied to the rear wheel 3 from a road surface or the like, and a damping device 22d configured to attenuate vibration of the spring 22s.

In descriptions below, the front wheel 2 and the rear wheel 3 may also be collectively referred to as 'wheel'. In addition, the suspensions 21 on the front wheel 2-side and the suspensions 22 on the rear wheel 3-side may also be collectively referred to as 'suspension 23'. In addition, the spring 21s and the spring 22s may also be collectively referred to as 'spring 23s'. Further, the damping device 21d and the damping device 22d may also be collectively referred to as 'damping device 200'.

In addition, the two-wheeled motor vehicle 1 includes a stroke sensor 31 configured to detect a stroke amount of the suspension 21, and a stroke sensor 32 configured to detect a stroke amount of the suspension 22. It may be exemplified that the stroke amount is a displacement amount from a state in which the suspension 21 and the suspension 22 are most contracted.

Further, the two-wheeled motor vehicle 1 includes an adjustment unit 70 configured to adjust a height of the vehicle main body 10, in other words, a vehicle height by changing an initial load (preload) that is applied to the spring 23s.

Further, the two-wheeled motor vehicle 1 includes a control device 100 configured to control a damping force of the damping device 200 and the initial load of the spring 23s.

A suspension system 20 according to the present invention is a system including the suspension 21, the suspension 22, and the control device 100.

(Damping Device 200)

FIG. 2 is referred to. The damping device 200 is similar to the damping device described in JP 2019-77198 A, and the members and parts having the same shapes and functions are denoted with the same reference signs, and the detailed descriptions thereof are omitted.

The damping device 200 has a cylinder 210, a piston 221, and a piston rod 222. An end portion 210a on one side (upper side in FIG. 2) of the cylinder 210 is connected to the vehicle main body 10. The piston rod 222 is configured to hold the piston 221 at a first end portion, and a second end portion 222a, which is an end portion on an opposite side (lower side in FIG. 2) to the first end portion, is connected to the wheel.

An inside of the cylinder 210 is divided into a first oil chamber 211 and a second oil chamber 212 by the piston 221.

The damping device 200 has a first oil passage 231, a second oil passage 232, a third oil passage 233, and a damping force control valve 240. In addition, the damping device 200 has a first branch path 251, a second branch path 252, a third branch path 253, and a fourth branch path 254.

Further, the damping device 200 has a first check valve 271, a second check valve 272, a third check valve 273, and a fourth check valve 274. Further, the damping device 200 has a reservoir 290 and a reservoir passage 291.

The damping force control valve 240 has a solenoid, and is configured to increase a pressure of operating oil passing through a valve as an amount of current supplied to the solenoid increases. The amount of current energized in the solenoid is controlled by the control device 100.

(Adjustment Unit 70)

FIG. 3 is referred to. The adjustment unit 70 includes a jack unit 71 provided to the suspension 23 and configured to adjust a length of the spring 23s, and a supply device 80 configured to supply oil to a jack chamber 72 of the jack unit 71.

The jack unit 71 has a support member 73 configured to support an end portion of the spring 23s on the vehicle main body 10-side, and a forming member 74 configured to form the jack chamber 72 together with the support member 73. The jack unit 71 is configured to adjust the length of the spring 23s by moving the support member 73 according to an amount of oil in the jack chamber 72. It may be exemplified that the support member 73, the jack chamber 72, and the forming member 74 are implemented by the support member of the rear suspension or the front fork, the jack chamber and the hydraulic jack described in JP-A-2018-144650 filed by the present applicant, respectively.

In addition, the jack unit 71 includes a movement amount sensor 75 configured to detect an amount of movement of the support member 73. An amount of movement of the support member 73 that is detected by the movement amount sensor 75 is an amount of movement when an amount of movement at a time when the support member 73 is located at a reference position is 0. The reference position is a position of the support member 73 at a time when the oil in the jack chamber 72 is 0, for example. As the movement amount sensor 75, for example, a sensor may be exemplified in which a coil is wound on an outer peripheral surface of the forming member 74, the support member 73 is made of a magnetic material, and an amount of movement of the support member 73 is detected using an inductance of the coil changing according to movement of the support member 73 with respect to the forming member 74.

As shown in FIG. 3, the supply device 80 includes a housing 81 configured to store oil and a circular cylinder-shaped piston 82 configured to slide in the housing 81. A reservoir chamber 83 configured to store oil is formed in a space surrounded by an inner surface of the housing 81 and the piston 82.

In addition, the supply device 80 includes a motor 84, a speed reducer 85 configured to reduce a rotation speed of the motor 84, and a screw 86 connected to an output shaft 85a of the speed reducer 85.

As the motor 84, a direct current (DC) motor with a brush may be exemplified. Drive of the motor 84 is controlled by the control device 100. As the speed reducer 85, a planetary speed reducer using a well-known planetary gear mechanism may be exemplified.

The screw 86 has a first portion 86a, a second portion 86b, and a third portion 86c, which are three circular cylinder-shaped portions having different diameters, sequentially from one side (right side in FIG. 2) to the other side (left side in FIG. 2) in a rotation axis direction. A male screw 86d is formed on an outer peripheral surface of the first portion 86a. The output shaft 85a of the speed reducer 85 is fitted on an inner side of the third portion 86c. Thereby, the screw 86 is configured to rotate integrally with the output shaft 85a of the speed reducer 85.

In addition, the supply device 80 includes a nut 87 having a female screw 87a formed thereon in mesh with the male screw 86d of the screw 86. The nut 87 has a flange 87b at an end portion on the other side.

Further, the supply device 80 includes an interposition member 88 interposed between the flange 87b of the nut 87 and the piston 82, and a cylindrical collar 89 arranged on an inner side of the interposition member 88 and on an outer side of the nut 87, and a cylindrical collar 90 arranged on an outer side of the interposition member 88. The interposition member 88 is an elastic member, and is sandwiched between the piston 82 and the flange 87b of the nut 87 in a state of being elastically deformed by being pressed by the piston 82 receiving a force from oil. Thereby, the interposition member 88 suppresses the nut 87 from rotating as the screw 86 rotates.

In addition, the supply device 80 includes a bearing 91 configured to rotatably support the screw 86, and a support member 92 configured to support the bearing 91. The bearing 91 is arranged between the support member 92 and the second portion 86b of the screw 86.

The piston 82, the motor 84, the speed reducer 85, the screw 86, the nut 87, the interposition member 88, the collar 89, the collar 90, the bearing 91, and the support member 92 described above are accommodated in the housing 81.

The supply device 80 includes a hose 93 mounted to the housing 81, provided between the reservoir chamber 83 and the jack chamber 72 of the jack unit 71 and configured to allow oil to flow between the reservoir chamber 83 and the jack chamber 72.

In the adjustment unit 70 configured as described above, the shaft of the motor 84 of the supply device 80 rotates, so that the screw 86 rotates in the same direction and the nut 87 moves toward one side in the rotation axis direction. As the nut 87 moves, the collar 89, the collar 90, and the interposition member 88 receive a force from the other side toward one side in the rotation axis direction, thereby moving the piston 82 toward one side in the rotation axis direction. Thereby, the oil is discharged from the reservoir chamber 83 by the piston 82, and the oil is supplied into the jack chamber 72 via the hose 93. As a result, the support member 73 moves toward the wheel-side (right side in FIG. 3) with respect to the forming member 74, in other words, the amount of movement of the support member 73 from the reference position increases, and the spring length of the spring 23s is shortened.

When the spring length of the spring 23s is shortened, a force by which the spring 23s pushes the support member 73 increases, as compared to a force before the support member 73 moves with respect to the forming member 74. As a result, even when a force acts on the wheel-side from the vehicle body, an initial load that does not change relative positions of the vehicle body and the wheel increases. In such a case, when the same force acts on the wheel-side from the vehicle body-side, a sinking amount of the suspension 23 (change in distance between the vehicle body and the wheel) decreases. For this reason, when the spring length of the spring 23s is shortened due to the movement of the support member 73 with respect to the forming member 74, a height of the vehicle main body 10 increases (vehicle height increases), as compared to a height before the support member 73 moves with respect to the forming member 74.

On the other hand, when the shaft of the motor 84 of the supply device 80 rotates in the opposite direction, the screw 86 also rotates in the opposite direction. Then, the force from the piston 82 that receives the force of the oil in the reservoir chamber 83 acts on the flange 87b of the nut 87 via the collar 89, the collar 90, and the interposition member 88, and the nut 87 moves toward the other side in the rotation axis direction. As the nut 87 moves toward the other side, a volume of the reservoir chamber 83 increases. Thereby, the support member 73 discharges the oil in the jack chamber 72, and this oil is supplied to the reservoir chamber 83. As a result, the support member 73 moves toward the vehicle body-side (left side in FIG. 3) with respect to the forming member 74, in other words, the amount of movement of the support member 73 from the reference position decreases, and the spring length of the spring 23s is lengthened.

When the spring length of the spring 23s is lengthened, the force by which the spring 23s pushes the support member 73 decreases, as compared to the force before the support member 73 moves with respect to the forming member 74. As a result, when the same force acts on the wheel-side from the vehicle body-side, the sinking amount of the suspension 23 increases. For this reason, when the spring length of the spring 23s is lengthened due to the movement of the support member 73 with respect to the forming member 74, the height of the vehicle main body 10 decreases (vehicle height decreases), as compared to the height before the support member 73 moves with respect to the forming member 74.

The vehicle height adjustment device 300 configured to adjust the vehicle height of the two-wheeled motor vehicle 1 is constituted by the adjustment unit 70 configured as described above, the control device 100, and the like.

(Control Device 100)

Figure 4:
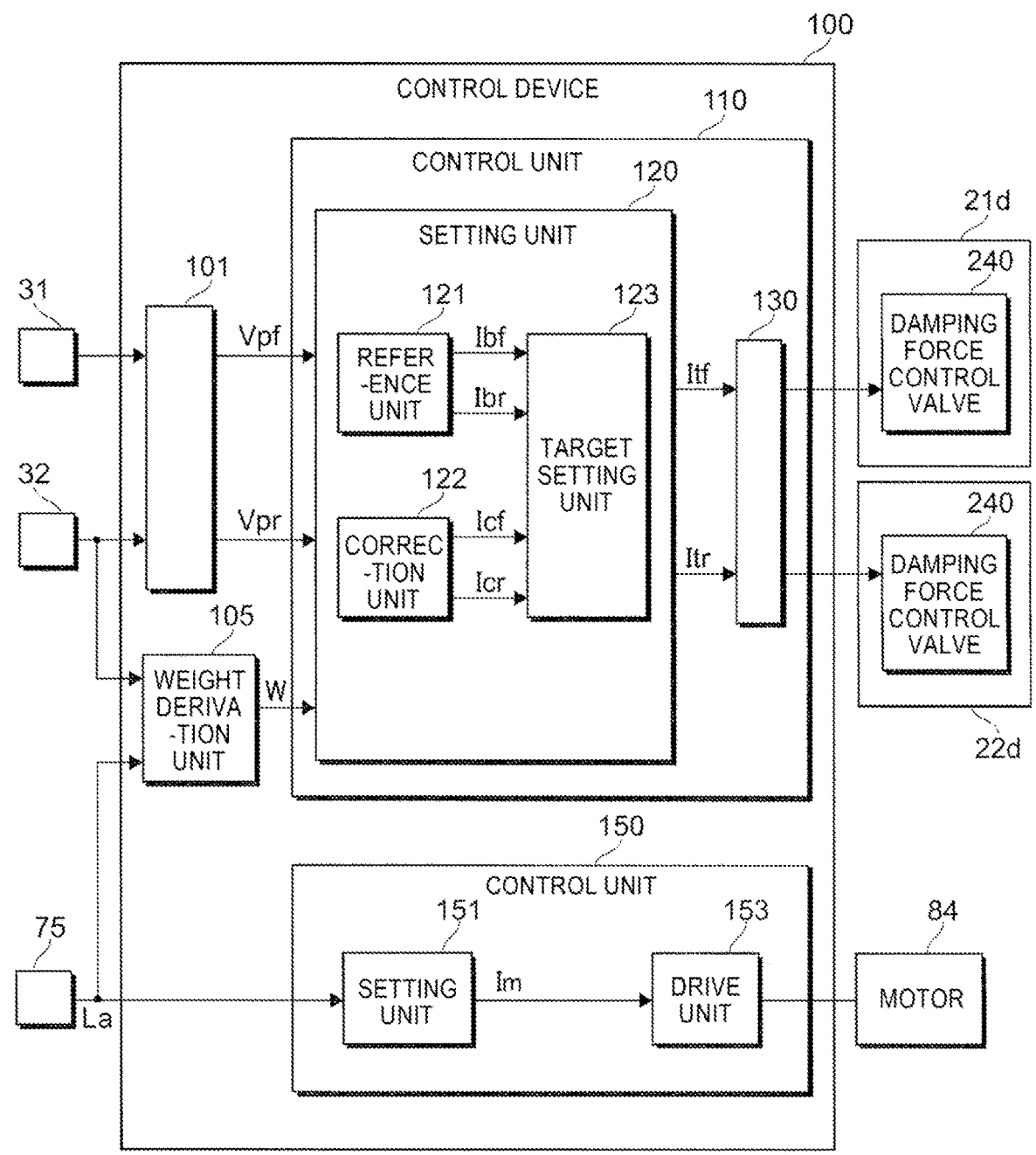
FIG. 4 shows an example of a block diagram of a control device 100.

FIG. 4 shows an example of a block diagram of the control device 100.

The control device 100 includes a CPU, a ROM in which programs to be executed by the CPU, various data, and the like are stored, a RAM used as a work memory of the CPU, and the like, and an EEPROM that is a non-volatile memory.

Output signals from the stroke sensor 31, the stroke sensor 32, the movement amount sensor 75, and the like described above are input to the control device 100.

The control device 100 includes a calculation unit 101 configured to calculate speeds Vpf and Vpr, which are rates of change in stroke amount, by using the output signals from the stroke sensors 31 and 32.

In addition, the control device 100 includes a weight derivation unit 105 configured to derive a weight loaded on the two-wheeled motor vehicle 1. In descriptions below, the weight loaded on the two-wheeled motor vehicle 1 may also be referred to as 'load weight W'.

In addition, the control device 100 includes a control unit 110 configured to control to change damping forces of the damping devices 21d and 22d by using the speeds Vpf and Vpr calculated by the calculation unit 101 and the load weight W derived by the weight derivation unit 105.

Further, the control device 100 includes a control unit 150 configured to control an initial load of the spring 23s by using an amount of movement of the support member 73 detected by the movement amount sensor 75. In descriptions below, the amount of movement of the support member 73 detected by the movement amount sensor 75 may also be referred to as 'actual amount of movement La'.

(Calculation Unit 101)

The calculation unit 101 is configured to calculate a speed Vpf, which is a change rate of the stroke amount of the suspension 21, by calculating an amount of change in stroke amount of the suspension 21 per unit time. In addition, the calculation unit 101 is configured to calculate a speed Vpr, which is a change rate of the stroke amount of the suspension 22, by calculating an amount of change in stroke amount of the suspension 22 per unit time. In descriptions below, the velocity Vpf and the velocity Vpr may also be collectively referred to as 'speed Vp'. In addition, a sign of the speed Vp in an extension direction of the suspension 23 in which a distance of the second end portion 222a with respect to the end portion 210a becomes long is set as positive, and a sign of the speed Vp in a compression direction of the suspension 23 in which the distance of the second end portion 222a with respect to the end portion 210a becomes short is set as negative.

(Control Unit 110)

The control unit 110 is configured to control to change the damping force by changing an amount of current that is supplied to the solenoid of the damping force control valve 240. Specifically, when increasing the damping force, the control unit 110 increases the amount of current that is supplied to the solenoid of the damping force control valve 240, and when decreasing the damping force, the control unit 110 decreases the amount of current that is supplied to the solenoid of the damping force control valve 240.

The control unit 110 includes a setting unit 120 configured to set target currents Itf and Itr to be supplied to the solenoid of the damping force control valve 240, and a drive unit 130 configured to drive the damping force control valve 240.

The setting unit 120 is configured to set the target current Itf on the front wheel-side to be supplied to the solenoid of the damping force control valve 240 of the damping device 21d, based on the speed Vpf and the like calculated by the calculation unit 101. In addition, the setting unit 120 is configured to set the target current Itr on the rear wheel-side to be supplied to the solenoid of the damping force control valve 240 of the damping device 22d, based on the speed Vpr and the like calculated by the calculation unit 101. In the below, the target current Itf and the target current Itr may also be collectively referred to as 'target current It'.

The setting unit 120 has a reference unit 121 configured to set reference currents Ibf and Ibr, which are references for setting the target currents Itf and Itr. In addition, the setting unit 120 has a correction unit 122 configured to set correction currents Icf and Icr for correcting the reference currents Ibf and Ibr according to the load weight W. In the below, the correction current Icf and the correction current Icr may also be collectively referred to as 'correction current Ic'.

Further, the setting unit 120 has a target setting unit 123 configured to finally set the target currents Itf and Itr by adding the reference currents Ibf and Ibr set by the reference unit 121 and the correction currents Icf and Icr set by the correction unit 122.

Figure 5:
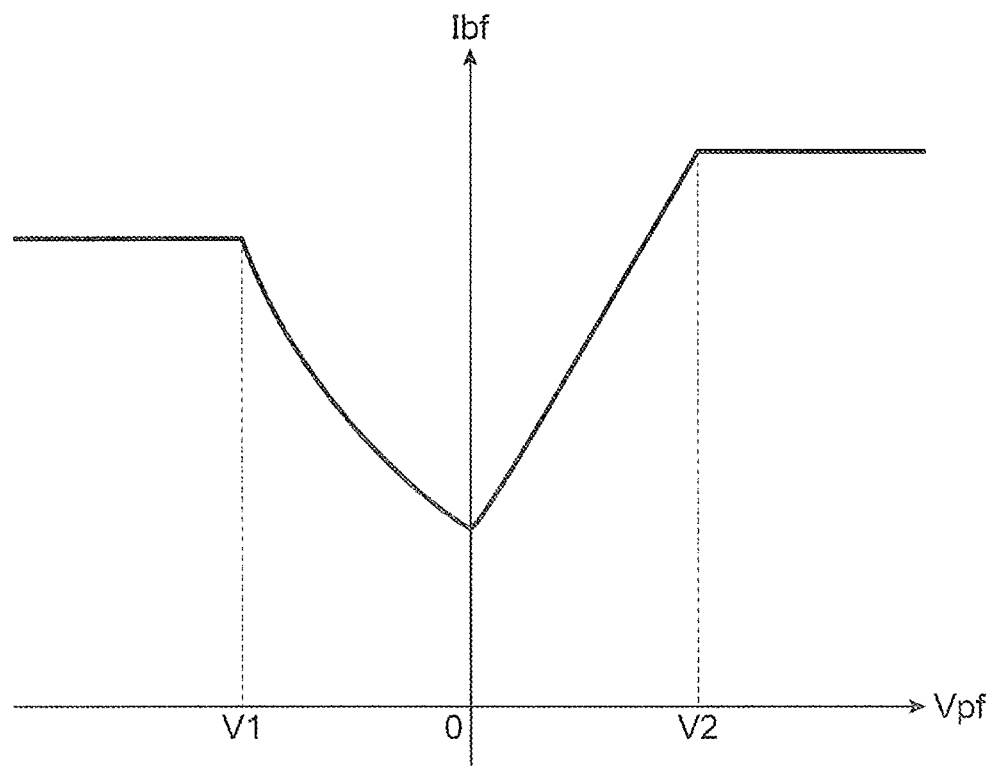
FIG. 5 is a schematic view of a control map showing an example of a relationship between a reference current Ibf and a speed Vpf.

FIG. 5 is a schematic view of a control map showing an example of a relationship between the reference current Ibf and the speed Vpf.

The reference unit 121 is configured to calculate the reference current Ibf corresponding to the speed Vpf. For example, the reference unit 121 calculates the reference current Ibf by substituting the speed Vpf into the control map exemplified in FIG. 5, which is prepared in advance based on an empirical rule and recorded in the ROM and shows a relationship between the reference current Ibf and the speed Vpf.

In the control map exemplified in FIG. 5, in a case where the speed Vpf is negative, when the speed Vpf is equal to or greater than a first predetermined speed V1, the amount of current is set to be larger as the speed Vpf decreases, and when the speed Vpf is smaller than the first predetermined speed V1, the amount of current is set to be constant. In addition, in a case where the speed Vpf is positive, when the speed Vpf is equal to or smaller than a second predetermined speed V2, the amount of current is set to be larger as the speed Vpf increases, and when the speed Vpf is greater than the second predetermined speed V2, the amount of current is set to be constant.

Note that, since a method for calculating the reference current Ibr by the reference unit 121 is the same as the method for calculating the reference current Ibf by the reference unit 121, the detailed descriptions thereof are omitted. In addition, since a control map showing an example of a relationship between the reference current Ibr and the speed Vpr is similar to the control map showing the example of the relationship between the reference current Ibf and the speed Vpf, the detailed descriptions thereof are omitted. However, the specific values of the first predetermined speed V1, the second predetermined speed V2, and the constant amount of current may be the same or different.

The correction unit 122 will be described in detail later.

The drive unit 130 has, for example, a transistor (FET) as a switching element connected between a positive electrode-side line of a power supply and a coil of the solenoid of the damping force control valve 240. The drive unit 130 is configured to control the drive of the damping force control valve 240 by driving a gate of the transistor to switch the transistor.

More specifically, the drive unit 130 switches the transistor so that the current to be supplied to the damping force control valve 240 becomes the target currents Itf and Itr set by the setting unit 120. That is, the drive unit 130 switches the transistor so that the current to be supplied to the damping force control valve 240 of the damping device 21d becomes the target current Itf set by the setting unit 120. In addition, the drive unit 130 switches the transistor so that the current to be supplied to the damping force control valve 240 of the damping device 22d becomes the target current Itr set by the setting unit 120.

(Control Unit 150)

The control unit 150 includes a setting unit 151 configured to set a target current Im to be supplied to the motor 84, and a drive unit 153 configured to drive the motor 84.

The drive unit 153 has, for example, a transistor (FET) as a switching element connected between the positive electrode-side line of the power supply and a coil of the motor 84. The drive unit 153 is configured to control the drive of the motor 84 by driving a gate of the transistor to switch the transistor. In addition, the drive unit 153 switches the transistor so that the current to be supplied to the motor 84 becomes the target current Im set by the setting unit 151.

The setting unit 151 is configured to set the target current Im for moving the piston 82 so that a target amount of movement Lt of the support member 73 of the jack unit 71 and an actual amount of movement La detected by the movement amount sensor 75 coincide with each other. It may be exemplified that the target amount of movement Lt is a value corresponding to a control mode selected by a user via a user interface provided to the two-wheeled motor vehicle 1.

In a case of moving the piston 82 in a direction of discharging oil from the reservoir chamber 83, the setting unit 151 is configured to set the target current Im to a predetermined rising value. On the other hand, in a case of moving the piston 82 in a direction of discharging oil from the jack chamber 72, the setting unit 151 is configured to set the target current Im to a predetermined lowering value. Note that, when a current in a direction of rotating the motor 84 so as to move the piston 82 to discharge oil from the reservoir chamber 83 is denoted with a plus and a current in a direction of rotating the motor 84 so as to move the piston 82 to discharge oil from the jack chamber 72 is denoted with a minus, it may be exemplified that the rising value is 8A and the lowering value is −8A.

In determining the moving direction of the piston 82, the setting unit 151 first decides whether a subtraction value ΔL (=Lt−La) obtained by subtracting the actual amount of movement La detected by the movement amount sensor 75 from the target amount of movement Lt is larger than 0. When the subtraction value ΔL is larger than 0 (ΔL>0), the setting unit 151 sets the target current Im to the rising value so as to move the piston 82 in the direction of discharging the oil from the reservoir chamber 83. On the other hand, when the subtraction value ΔL is smaller than 0 (ΔL<0), the setting unit 151 sets the target current Im to the lowering value so as to move the piston 82 in the direction of discharging the oil from the jack chamber 72. On the other hand, when the subtraction value ΔL is 0 (ΔL=0), the setting unit 151 sets the target current Im to 0.

(Weight Derivation Unit 105)

Figure 6:
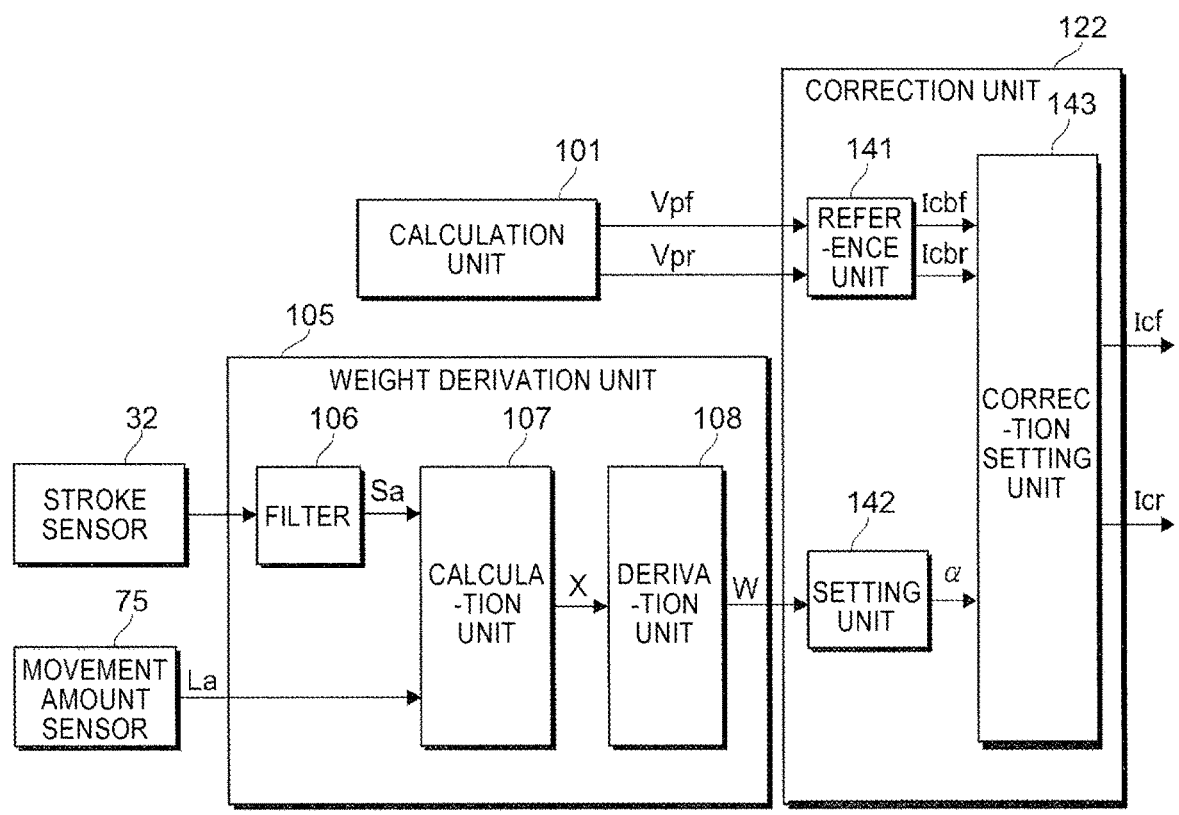
FIG. 6 shows an example of a block diagram of a weight derivation unit 105 and a correction unit 122.

FIG. 6 shows an example of a block diagram of the weight derivation unit 105 and the correction unit 122.

The weight derivation unit 105 is configured to derive the load weight W of the two-wheeled motor vehicle 1.

Here, the load weight W is a weight loaded on the two-wheeled motor vehicle 1. In a case where a reference stroke amount Sb is defined as described later, when a total weight loaded on the two-wheeled motor vehicle 1 is referred to as W0 and a weight of a driver sitting on the seat 14 is referred to as W1, the load weight W is given by W=W0−W1. That is, the weight obtained by subtracting the weight in a 'reference state' assumed in determining the reference stroke amount Sb from the total weight loaded on the two-wheeled motor vehicle 1 is the load weight W. For example, in a state where one driver straddles the two-wheeled motor vehicle 1 under environment of 1 gravitational acceleration (9.8 m/s$^2$) and the driver's weight is entirely applied to the two-wheeled motor vehicle 1, a stroke amount at a time when the actual amount of movement La is 0 is set as a reference stroke amount Sb. In this case, when luggage is placed on a rear part of the seat 14 or a luggage carrier (not shown) next to the rear part of the seat 14, the load weight W is a weight of the luggage. In addition, for example, when a person rides on a tandem seat at the rear part of the seat 14, the load weight W is a weight of the person riding on the tandem seat. Further, for example, when a person rides on the tandem seat and the luggage is placed on the luggage carrier, the load weight W is a total weight of the weight of the person riding on the tandem seat and the weight of the luggage.

The weight derivation unit 105 is configured to derive the load weight W by using the stroke amount of the suspension 22 detected by the stroke sensor 32 and the actual amount of movement La detected by the movement amount sensor 75. When deriving the load weight W, it is considered that a weight of the driver sitting on the seat 14 is applied with being divided into the suspension 21 on the front wheel 2-side and the suspension 22 on the rear wheel 3-side and the weight of the person riding on the tandem seat or the load placed on the luggage carrier is applied to the suspension 22 on the rear wheel 3-side.

The weight derivation unit 105 has a filter 106 configured to smooth an output value of the stroke sensor 32. The filter 106 is configured to perform filtering processing of attenuating a component of a frequency, which is higher than a cutoff frequency, of the output value of the stroke sensor 32 without attenuating a component of a frequency lower than the cutoff frequency. For example, it may be exemplified that the filter 106 is a low-pass filter.

In addition, the weight derivation unit 105 has a calculation unit 107 configured to calculate an amount of contraction X of the spring 22s by using the stroke amount of the suspension 22 smoothed by the filter 106 and the actual amount of movement La detected by the movement amount sensor 75. In the below, the stroke amount of the suspension 22 smoothed by the filter 106 may also be referred to as 'actual stroke amount Sa'. In this way, in the present embodiment, in view of a fact that the stroke amount varies at high speed when the two-wheeled motor vehicle 1 is traveling on a rough road, the amount of contraction X is calculated using the actual stroke amount Sa after the smoothing by the filter 106. This makes it easier to improve the derivation accuracy of the load weight W.

Further, the weight derivation unit 105 has a derivation unit 108 configured to derive the load weight W by using the amount of contraction X calculated by the calculation unit 107.

Figure 7:
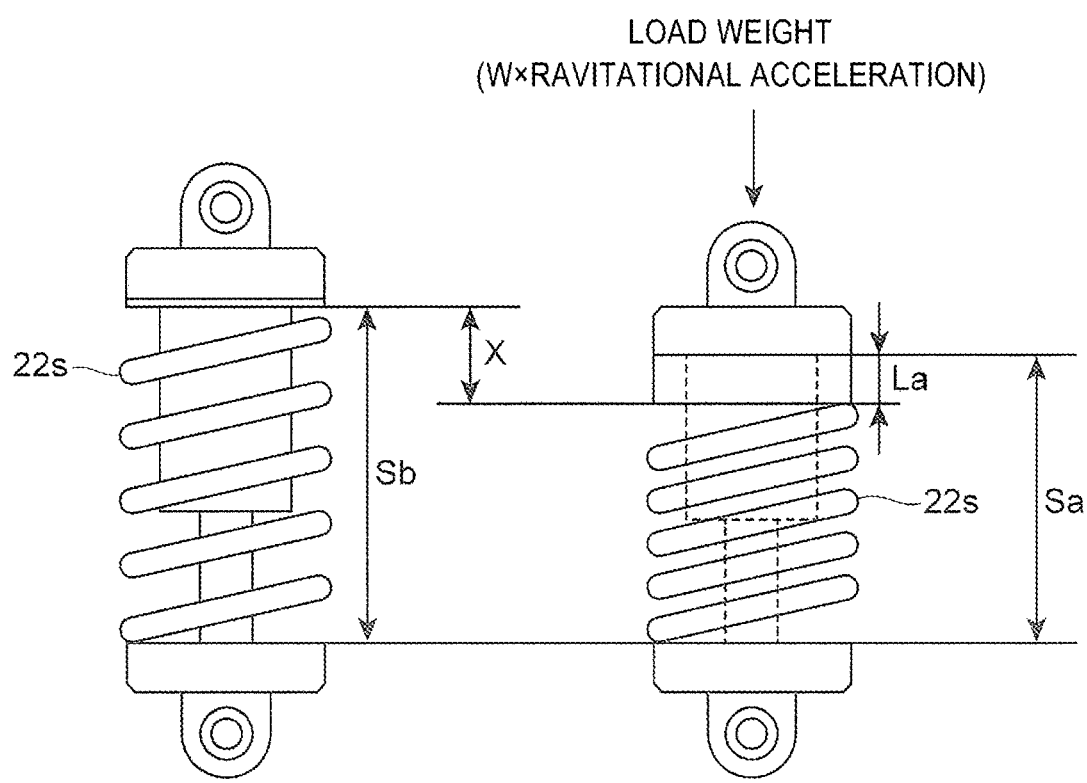
FIG. 7 shows an example of an amount of contraction X of a spring 22s.

FIG. 7 shows an example of the amount of contraction X of the spring 22s.

As shown in FIG. 7, the amount of contraction X of the spring 22s is a value (Sb−Sa+La) obtained by adding the actual amount of movement La to a subtraction value (Sb−Sa) obtained by subtracting the actual stroke amount Sa from the reference stroke amount Sb. Here, the reference stroke amount Sb is a stroke amount of the suspension 22 at a time when the actual amount of movement La is 0 in a state where one driver straddles the two-wheeled motor vehicle 1 under environment of 1 gravitational acceleration (9.8 m/s²) and the driver's weight is entirely applied to the two-wheeled motor vehicle 1. It may be exemplified that the reference stroke amount Sb is an amount determined in advance and stored in the ROM.

In view of the above, the calculation unit 107 calculates the amount of contraction X by using a following equation (1).

$$X = Sb - Sa + La \quad (1)$$

It may be exemplified that the calculation unit 107 calculates the amount of contraction X, for example, during normal driving in which the two-wheeled motor vehicle 1 is traveling at a predetermined vehicle speed or higher without accelerating or decelerating on a flat road having small irregularities. This makes it possible to calculate the amount of contraction X by using the actual stroke amount Sa, which is caused as a load corresponding to the load weight W is applied to the suspension 22.

A spring load of the spring 22s can be calculated by multiplying the amount of contraction X calculated by the calculation unit 107 by a spring constant K of the spring 22s. A value obtained by multiplying a component of the spring load in a direction perpendicular to a ground by the number n (2, in the embodiment) of springs 22s is equal to a load. The derivation unit 108 is configured to derive a value obtained by dividing the load by the gravitational acceleration, as the load weight W. That is, the derivation unit 108 derives the load weight W by using a following equation (2).

$$W = X \times K \times R \times n / 9.8 \quad (2)$$

Note that, R is a coefficient for converting the spring load into a component in the direction perpendicular to the ground. It may be exemplified that R is a value determined in advance and stored in the ROM. In addition, K and n are also stored in advance in the ROM.

Next, the correction unit 122 is described.

The correction unit 122 has a reference unit 141 configured to set reference currents Icbf and Icbr, which are references for setting the correction currents Icf and Icr. In the below, the reference current Icbf and the reference current Icbr may also be collectively referred to as 'reference current Icb'.

In addition, the correction unit 122 has a setting unit 142 configured to set a correction coefficient α for correcting the reference currents Icbf and Icbr according to the load weight W.

Further, the correction unit 122 has a correction setting unit 143 configured to finally set the correction currents Icf and Icr by multiplying the reference currents Icbf and Icbr set by the reference unit 141 and the correction coefficient α set by the setting unit 142.

Figure 8:
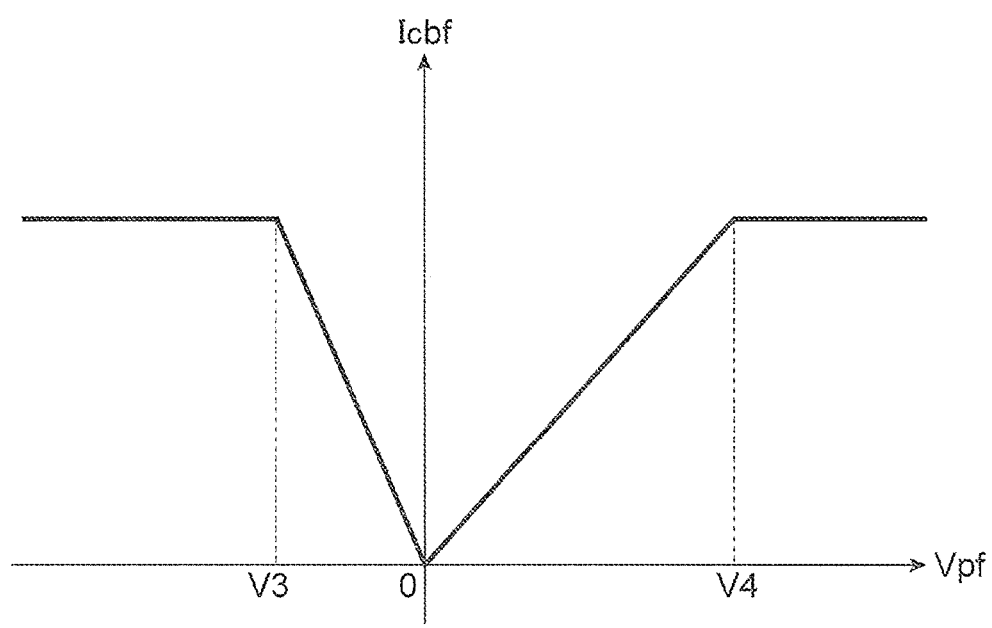
FIG. 8 is a schematic view of a control map showing an example of a relationship between a reference current Icbf and a speed Vpf.

FIG. 8 is a schematic view of a control map showing an example of a relationship between the reference current Icbf and the speed Vpf.

The reference unit 141 calculates the reference current Icbf corresponding to the speed Vpf. For example, the reference unit 141 calculates the reference current Icbf by substituting the speed Vpf into the control map exemplified in FIG. 8, which is prepared in advance based on an empirical rule and recorded in the ROM and shows a relationship between the reference current Icbf and the speed Vpf.

In the control map exemplified in FIG. 8, in a case where the speed Vpf is negative, when the speed Vpf is equal to or greater than a third predetermined speed V3, the amount of current is set to be larger as the speed Vpf decreases, and when the speed Vpf is smaller than the third predetermined speed V3, the amount of current is set to be constant. In addition, in a case where the speed Vpf is positive, when the speed Vpf is equal to or smaller than a fourth predetermined speed V4, the amount of current is set to be larger as the speed Vpf increases, and when the speed Vpf is greater than the fourth predetermined speed V4, the amount of current is set to be constant. Note that, the constant amount of current when the speed Vpf is smaller than the third predetermined speed V3 and the constant amount of current when the speed Vpf is greater than the fourth predetermined speed V4 may be the same or different. In addition, a dead zone in which the amount of current is 0 regardless of the value of the speed Vpf may be set in the control map.

Since a method for calculating the reference current Icbr by the reference unit 121 is the same as the method for calculating the reference current Icbf, the detailed descriptions thereof are omitted. In addition, since a control map showing an example of a relationship between the reference current Icbr and the speed Vpr is similar to the control map showing the example of the relationship between the reference current Icbf and the speed Vpf, the detailed descriptions thereof are omitted. However, the specific values of the third predetermined speed V3, the fourth predetermined speed V4, and the constant amount of current may be the same or different.

Figure 9:
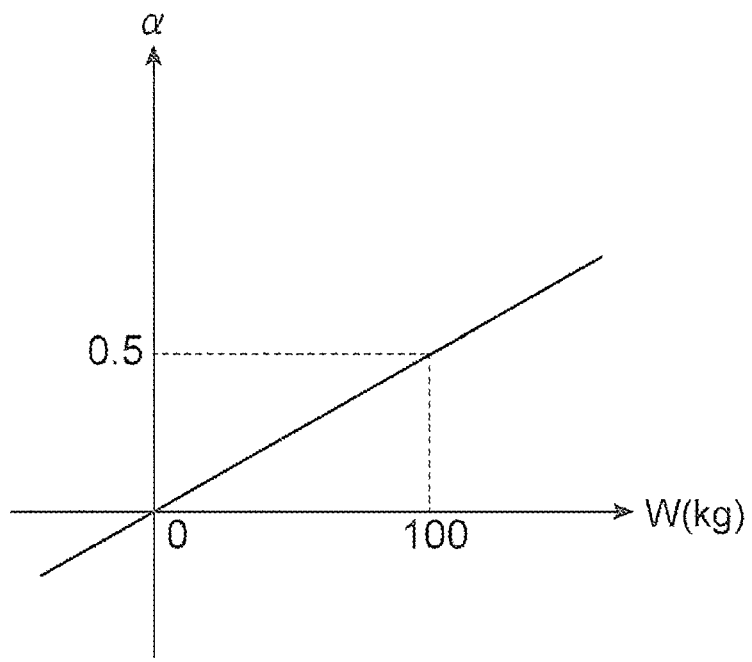
FIG. 9 is a schematic view of a control map showing an example of a relationship between a load weight W and a correction coefficient α.

FIG. 9 is a schematic view of a control map showing an example of a relationship between the load weight W and the correction coefficient α.

The setting unit 142 calculates the correction coefficient α corresponding to the load weight W. For example, the reference unit 142 calculates the correction coefficient α by substituting the load weight W into the control map exemplified in FIG. 9, which is prepared in advance based on an empirical rule and recorded in the ROM and shows a relationship between the load weight W and the correction coefficient α.

In the control map exemplified in FIG. 9, when the load weight W is positive, the correction coefficient α is set to be larger as the load weight W becomes heavier. In addition, when the load weight W is negative, the correction coefficient α is set to be smaller as the load weight W becomes lighter. It may be exemplified that the correction coefficient α at a time when the load weight W is 0 (kg) is 0 and the correction coefficient α at a time when the load weight W is 100 (kg) is 0.5.

(Operations)

In the two-wheeled motor vehicle 1 configured as described above, when the load weight W derived by the weight derivation unit 105 is 0, the setting unit 142 of the correction unit 122 sets the correction coefficient α to 0, and the correction setting unit 143 sets the correction currents Icf and Icr to 0. When the load weight W derived by the weight derivation unit 105 is heavier than 0, the setting unit 142 sets the correction coefficient α to a value larger than 0. When the speed Vp is not 0, the reference unit 141 sets the reference current Icb to a positive value. Therefore, the correction setting unit 143 sets the correction currents Icf and Icr to values larger than 0. Thereby, the damping force of the suspension 23 is controlled to be increased (to be changed), according to the load weight W heavier than 0. On the other hand, when the load weight W derived by the weight derivation unit 105 becomes a negative value due to a fact that an actual weight of the driver is lighter than a weight assumed in advance, for example, the setting unit 142 of the correction unit 122 sets the correction coefficient α to a value smaller than 0. When the speed Vp is not 0, the reference unit 141 sets the reference current Icb to a positive value. Therefore, the correction setting unit 143 sets the correction currents Icf and Icr to values smaller than 0. Thereby, the damping force of the suspension 23 is controlled to be decreased (to be changed), according to the load weight W lighter than 0 due to the fact that the actual weight of the driver is lighter than the weight assumed in advance.

In addition, the two-wheeled motor vehicle 1 includes the control device 100 as an example of the load weight derivation device having the calculation unit 107 configured to calculate the amount of contraction X of the spring 22s of the suspension 22 arranged between the vehicle main body 10 and the rear wheel 3 and the derivation unit 108 configured to derive the load weight W loaded on the vehicle main body 10 by using the amount of contraction X calculated by the calculation unit 107. The calculation unit 107 sets, as the amount of contraction X, the value (Sb−Sa+La) obtained by adding the actual amount of movement La to the subtraction value (Sb−Sa), which is obtained by subtracting the actual stroke amount Sa as an example of the stroke amount of the suspension 22 during traveling of the two-wheeled motor vehicle 1 from the reference stroke amount Sb as an example of the predetermined reference value. Thereby, the calculation unit 107 can calculate the amount of contraction X due to the load equivalent to the load weight W applied to the suspension 22 with higher accuracy than in a case of estimation using another method. As a result, the control device 100 can derive the load weight W with high accuracy.

In addition, the derivation unit 108 derives the load weight W by using the equation (2). Thereby, when the spring constant K of the spring 22s, the number n of the springs 22s, and the coefficient R corresponding to the specification of the two-wheeled motor vehicle 1 are stored in advance in the ROM, the control device 100 can derive the load weight W corresponding to the specification of the two-wheeled motor vehicle 1.

Further, in the control device 100, the reference unit 141 sets the reference currents Icbf and Icbr by using the control map exemplified in FIG. 8, and the setting unit 142 sets the correction coefficient α by using the control map exemplified in FIG. 9. Thereby, in order to set the correction coefficient α corresponding to the specification of the two-wheeled motor vehicle 1, the control map of the relationship between the load weight W and the correction coefficient α may be changed and stored in advance in the ROM, according to the specification of the two-wheeled motor vehicle 1, and the control map that is used by the reference unit 141 is not required to be changed. As a result, according to the control device 100, it becomes possible to simply set the correction current Ic corresponding to the load weight W.

Note that, in the above-described embodiment, the aspect where the weight derivation unit 105 derives the load weight W by using the actual stroke amount Sa of the suspension 22 has been exemplified. However, the present invention is not limited to such aspect. The weight derivation unit 105 may also be configured to derive the load weight W by using the stroke amount of the suspension 21, or may be configured to derive the load weight W by using the stroke amounts of both the suspension 21 and the suspension 22.

In addition, the correction unit 122 may be further configured to set the correction currents Icf and Icr, in consideration of a traveling mode. It may be exemplified that the traveling mode is selected by the user via, for example, the user interface provided to the two-wheeled motor vehicle 1 and includes a sports mode and a comfort mode. The correction unit 122 may also be configured to set the correction currents Icf and Icr by multiplying the reference currents Icbf and Icbr set by the reference unit 141, the correction coefficient α set by the setting unit 142, and the correction coefficient determined in advance for each traveling mode. Note that, it may be exemplified that the correction coefficient in the sports mode is 1 and the correction coefficient in the comfort mode is 0.7.

Second Embodiment

A vehicle height adjustment device 320 according to a second embodiment is different from the vehicle height adjustment device 300 according to the first embodiment, in that it has a control device 400 instead of the control device 100. The control device 400 is different from the control device 100, in terms of a control unit 450 corresponding to the control unit 150. In the below, differences from the first embodiment are described. In the first embodiment and the second embodiment, the parts having the same functions are denoted with the same reference signs, and the detailed descriptions thereof are omitted.

Figure 10:
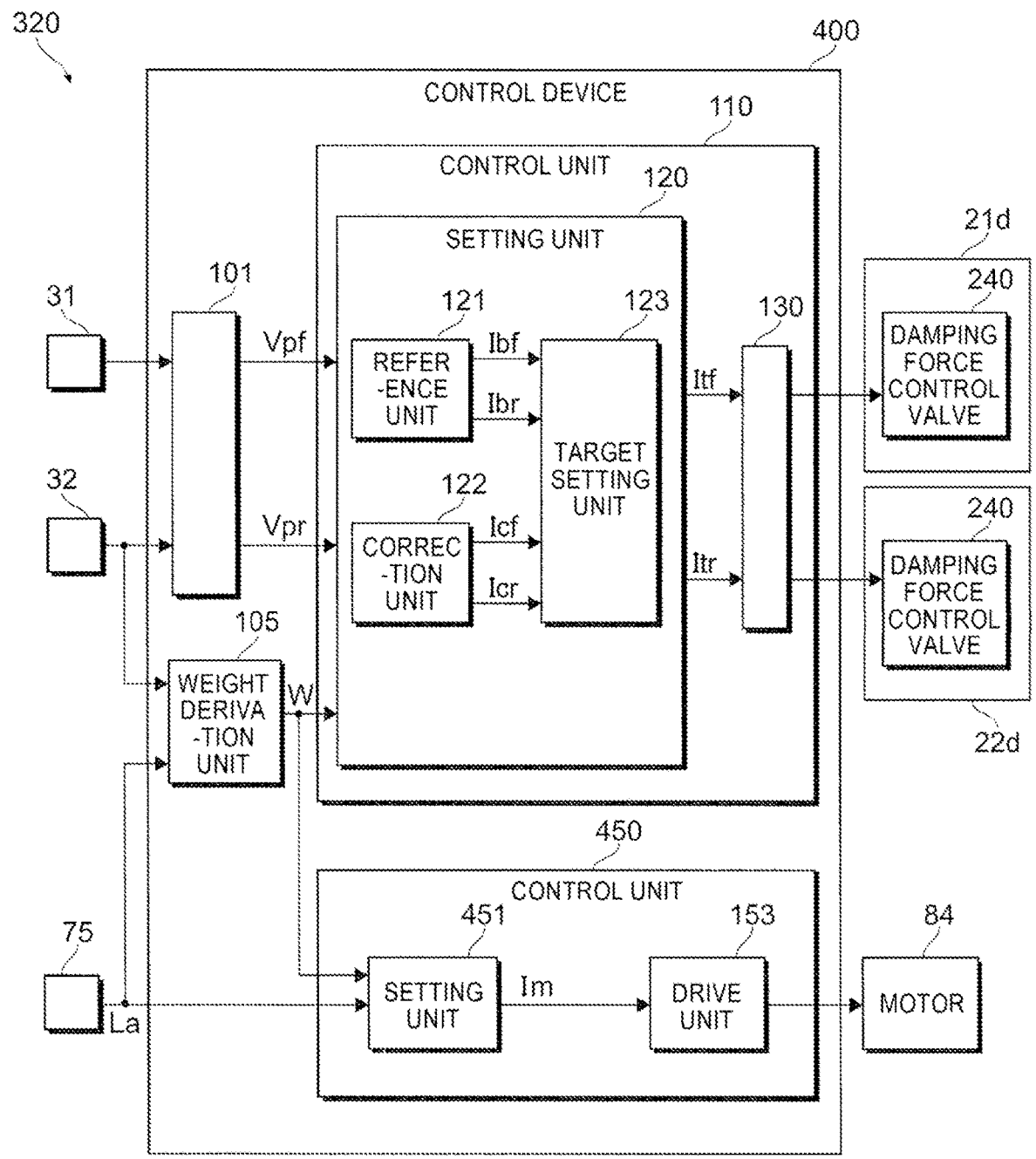
FIG. 10 shows an example of a block diagram of a control device 400 according to a second embodiment.

FIG. 10 shows an example of a block diagram of the control device 400.

The control unit 450 includes a setting unit 451 configured to set a target current Im to be supplied to the motor 84, and the drive unit 153.

The setting unit 451 is configured to set the target current Im for moving the piston 82 so that a target amount of movement Lt of the support member 73 of the jack unit 71 and an actual amount of movement La detected by the movement amount sensor 75 coincide with each other. The setting unit 451 is configured to set the target amount of movement Lt, according to a control mode selected by the user via the user interface provided to the two-wheeled motor vehicle 1 and the load weight W derived by the weight derivation unit 105.

For example, the setting unit 451 sets a correction coefficient β corresponding to the load weight W derived by the weight derivation unit 105, and sets, as the target amount of movement Lt, a value obtained by multiplying the correction coefficient β by a value corresponding to the control mode selected by the user.

Figure 11:
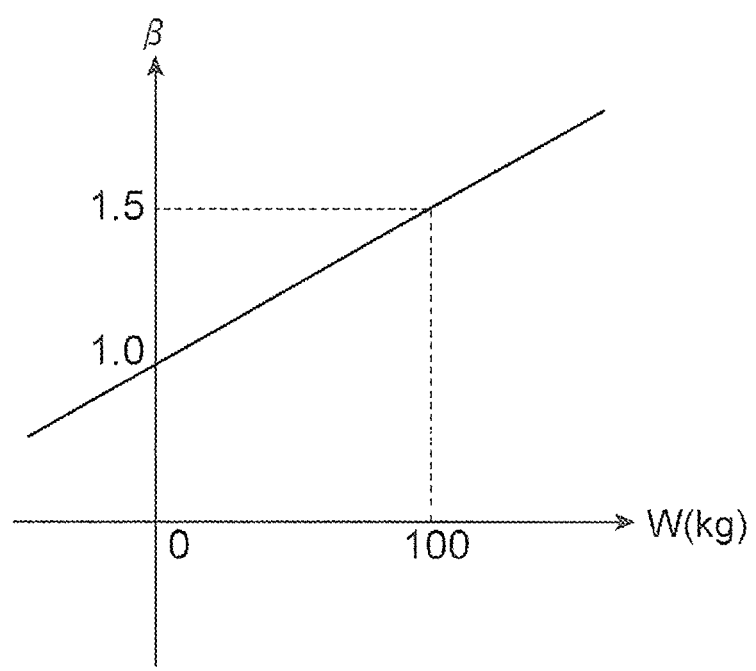
FIG. 11 is a schematic view of a control map showing an example of a relationship between the load weight W and a correction coefficient β.

FIG. 11 is a schematic view of a control map showing an example of a relationship between the load weight W and the correction coefficient β.

In the control map exemplified in FIG. 11, the correction coefficient β is 1 when the load weight W is 0, and the correction coefficient β is set to be larger than 1 when the load weight W is positive, and the correction coefficient β is set to be smaller than 1 when the load weight W is negative. In addition, when the load weight W is positive, the correction coefficient β is set to be larger as the load weight W becomes heavier, and when the load weight W is negative, the correction coefficient β is set to be smaller as the load weight W becomes lighter. It may be exemplified that when the load weight W is 100 (kg), the correction coefficient β is 1.5.

As described above, the vehicle height adjustment device 320 includes the suspension 22, the adjustment unit 70, the calculation unit 107 configured to calculate the amount of contraction X of the spring 22s, the derivation unit 108 configured to derive the load weight W by using the amount of contraction X, and the control unit 450 configured to control to change the amount of movement of the support member 73 according to the load weight W.

In the vehicle height adjustment device 320 configured in this way, when the load weight W derived by the weight derivation unit 105 is 0, the setting unit 451 sets the correction coefficient β to 1, so that the target amount of movement Lt is set to a value corresponding to the control mode selected by the user. This is the same as the target amount of movement Lt set by the setting unit 151 of the control unit 150 that does not consider the load weight W derived by the weight derivation unit 105. When the load weight W derived by the weight derivation unit 105 is heavier than 0, the setting unit 451 sets the correction coefficient β to a value larger than 1, and sets the target amount of movement Lt to a value obtained by multiplying the correction coefficient β by a value corresponding to the control mode. Thereby, it is possible to suppress the vehicle height from becoming lower than the target vehicle height corresponding to the control mode, when a person rides on the tandem seat, when luggage is placed on the luggage carrier, or the like. Note that, when the load weight W derived by the weight derivation unit 105 is lighter than 0, the setting unit 451 sets the correction coefficient β to a value smaller than 1, and sets the target amount of movement Lt to a value obtained by multiplying the correction coefficient β by a value corresponding to the control mode. Thereby, it is possible to suppress the vehicle height from becoming higher than the target vehicle height corresponding to the control mode, when an actual weight of the driver is lighter than a weight assumed in advance, or the like.

Third Embodiment

A two-wheeled motor vehicle 5 according to a third embodiment is different from the two-wheeled motor vehicle 1 according to the first embodiment, in that it does not have the adjustment unit 70 and has a control device 500 instead of the control device 100. In the below, differences from the first embodiment are described. In the first embodiment and the third embodiment, the parts having the same functions are denoted with the same reference signs, and the detailed descriptions thereof are omitted.

Figure 12:
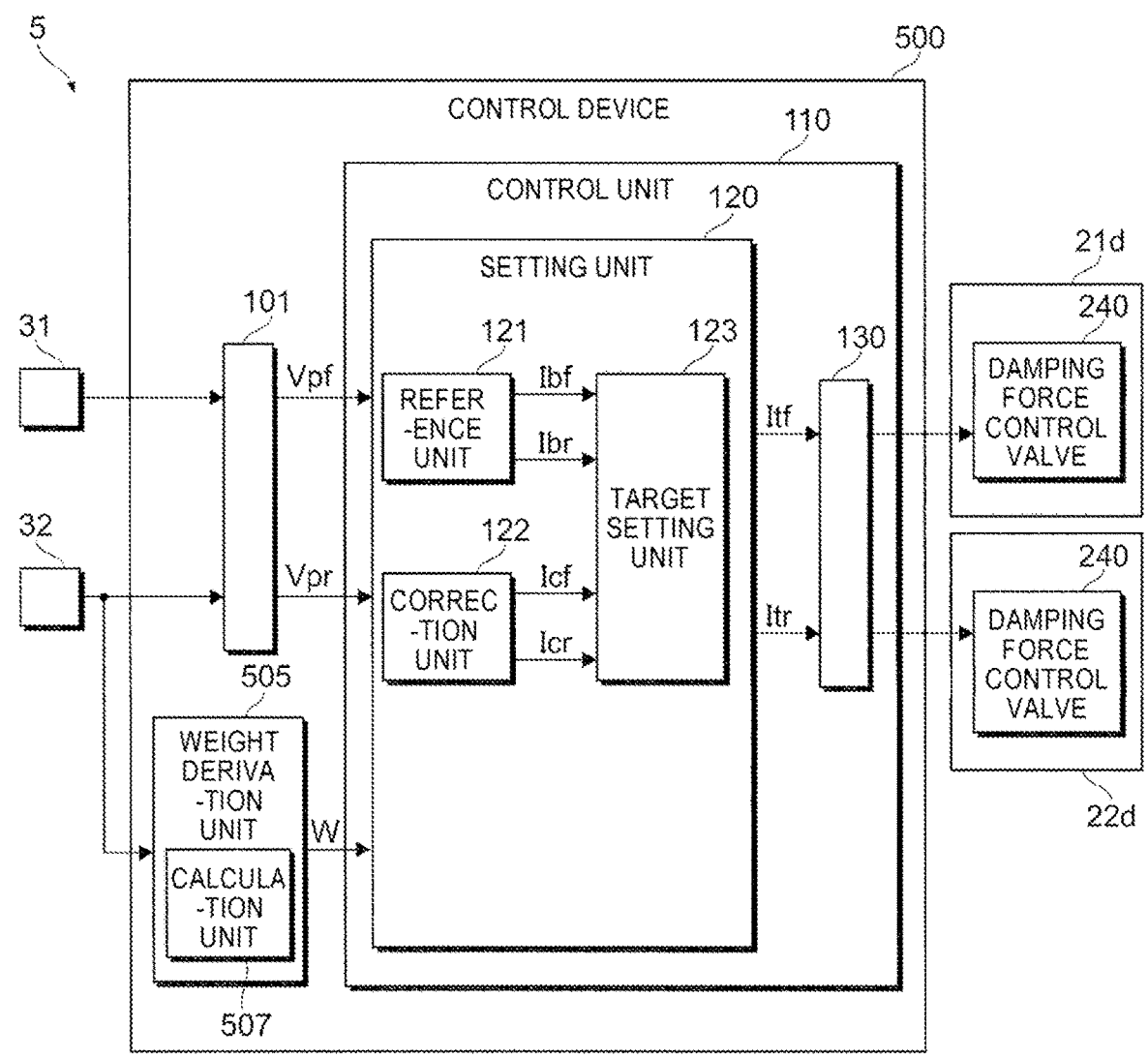
FIG. 12 shows an example of a block diagram of a control device 500 according to a third embodiment.

FIG. 12 shows an example of a block diagram of the control device 500 according to the third embodiment.

The control device 500 includes the calculation unit 101 and the control unit 110. In addition, the control device 500 includes a weight derivation unit 505 corresponding to the weight derivation unit 105. However, the control device 500 does not include the control unit 150.

The weight derivation unit 505 has the filter 106, a calculation unit 507 corresponding to the calculation unit 107, and the derivation unit 108.

Since the two-wheeled motor vehicle 5 according to the third embodiment does not include the adjustment unit 70, the amount of contraction X of the spring 22s is a value obtained by subtracting the actual stroke amount Sa from the reference stroke amount Sb. In view of the above, the calculation unit 507 calculates the amount of contraction X by using a following equation (3).

$$X = Sb - Sa \quad (3)$$

After the calculation unit 507 calculates the amount of contraction X, the derivation unit 108 derives the load weight W by using the above equation (2). In addition, the control unit 110 controls to change the damping force of the damping device 200, according to the load weight W derived by the derivation unit 108.

As described above, the calculation unit 507 sets, as the amount of contraction X, a value obtained by subtracting the actual stroke amount Sa during traveling of the two-wheeled motor vehicle 5 from the predetermined reference stroke amount Sb. Thereby, in the two-wheeled motor vehicle 5 without the adjustment unit 70, the calculation unit 507 can calculate the amount of contraction X due to the load equivalent to the load weight W applied to the suspension 22 with higher accuracy than in a case of estimation using another method. As a result, the control device 500 can derive the load weight W with high accuracy. The control device 500 can adjust to change the damping force according to the load actually applied to the suspension 23, when a person rides on the tandem seat, when luggage is placed on the luggage carrier, when the actual weight of the driver is lighter than the weight assumed in advance, and the like.

The invention claimed is:

1. A control device comprising:
a calculation unit configured to calculate an amount of contraction of a spring of a suspension arranged between a vehicle main body and a wheel;
a derivation unit configured to derive a weight loaded on the vehicle main body by using the amount of contraction calculated by the calculation unit;
a control unit configured to control to change a damping force of the suspension, according to the weight derived by the derivation unit; and
a filter configured to smooth an output value of a stroke sensor configured to detect a stroke amount of the suspension,
wherein the calculation unit is configured to calculate the amount of contraction by using a stroke amount of the suspension during traveling of a vehicle, which has been smoothed by the filter.

2. The control device according to claim 1, wherein the control unit is configured to control to increase the damping force when the weight is heavier than a predetermined value and to decrease the damping force when the weight is lighter than the predetermined value.

3. A suspension system comprising:
the control device according to claim 2; and
a suspension whose damping force is controlled by the control device.

4. A saddle-type vehicle comprising:
a vehicle main body;
a wheel, and
the suspension system according to claim 3.

5. A suspension system comprising:
the control device according to claim 1; and
a suspension whose damping force is controlled by the control device.

6. A saddle-type vehicle comprising:
a vehicle main body;
a wheel, and
the suspension system according to claim 5.

* * * * *